United States Patent
Kupiszewski et al.

(10) Patent No.: US 9,835,380 B2
(45) Date of Patent: Dec. 5, 2017

(54) TUBE IN CROSS-FLOW CONDUIT HEAT EXCHANGER

(71) Applicant: General Electric Company, Schenectady, NY (US)

(72) Inventors: Thomas Kupiszewski, Liberty Township, OH (US); Jeffrey Douglas Rambo, Mason, OH (US); James F. Bonar, Cincinnati, OH (US); Jared Wolfe, West Chester, OH (US)

(73) Assignee: General Electric Company, Schenectady, NY (US)

( * ) Notice: Subject to any disclaimer, the term of this patent is extended or adjusted under 35 U.S.C. 154(b) by 249 days.

(21) Appl. No.: 14/656,789

(22) Filed: Mar. 13, 2015

(65) Prior Publication Data

US 2016/0265850 A1  Sep. 15, 2016

(51) Int. Cl.
*F28F 9/02* (2006.01)
*F28D 1/02* (2006.01)
(Continued)

(52) U.S. Cl.
CPC ........... *F28D 1/0233* (2013.01); *F01D 25/12* (2013.01); *F28D 1/05375* (2013.01);
(Continued)

(58) Field of Classification Search
CPC .............. F28D 1/05375; F28D 7/163; F28D 2021/0021; F01D 25/12; F28F 1/006;
(Continued)

(56) References Cited

U.S. PATENT DOCUMENTS 2,479,071 A   8/1949   Henstridge
3,528,250 A   9/1970   Johnson
(Continued)

FOREIGN PATENT DOCUMENTS

CA       2415536 A1    6/2004
DE   102005049067 A1   4/2007
(Continued)

OTHER PUBLICATIONS

A European Search Report and Opinion issued in connection with corresponding EP Application No. 16159798.4 dated Aug. 30, 2016.
(Continued)

*Primary Examiner* — Justin Jonaitis
(74) *Attorney, Agent, or Firm* — General Electric Company; Brian P. Overbeck

(57) ABSTRACT

A heat exchanger that includes an input cavity defined by inlet cavity walls; a heat exchanger portion in fluid communication with the input cavity and defined between a first side and a second side, and wherein a plurality of baffles are positioned within the heat exchanger portion; and an outlet cavity in fluid communication with the heat exchanger portion and defined by outlet cavity walls. The heat exchanger portion comprises: a plurality of first fluid paths defined between the baffles and extending from the input cavity to the outlet cavity, and a plurality of tubes extending through the heat exchanger portion from the first side to the second side. Each tube extends through the baffles so as to define a second fluid path through the heat exchanger portion. Heat exchanger systems are also generally provided, along with methods for cooling a hot fluid input with a heat exchanger.

16 Claims, 17 Drawing Sheets

(51) Int. Cl.
*F28D 1/053* (2006.01)
*F01D 25/12* (2006.01)
*F28D 7/16* (2006.01)
*F28F 1/00* (2006.01)
*F28D 21/00* (2006.01)
*F28F 9/22* (2006.01)

(52) U.S. Cl.
CPC .............. *F28D 7/163* (2013.01); *F28F 1/006* (2013.01); *F28D 2021/0021* (2013.01); *F28F 2009/226* (2013.01); *F28F 2225/02* (2013.01); *Y02T 50/672* (2013.01); *Y02T 50/675* (2013.01)

(58) Field of Classification Search
CPC ............ F28F 2009/226; F28F 2225/02; Y02T 50/672; Y02T 50/675
USPC .......................................... 165/172, 173, 174
See application file for complete search history.

(56) References Cited

U.S. PATENT DOCUMENTS

| | | | |
|---|---|---|---|
| 3,735,588 A | 5/1973 | Moskowitz et al. | |
| 3,841,271 A * | 10/1974 | Harris, Jr. | F22B 1/063 122/32 |
| 3,885,942 A * | 5/1975 | Moore | C03B 23/207 165/10 |
| 3,948,317 A * | 4/1976 | Moore | C03B 23/207 165/10 |
| 4,137,705 A | 2/1979 | Andersen et al. | |
| 4,246,959 A | 1/1981 | Byrne | |
| 4,275,785 A * | 6/1981 | Kerivan | B21C 37/22 165/183 |
| 4,638,857 A | 1/1987 | Fournier | |
| 4,676,305 A * | 6/1987 | Doty | F28D 7/1653 165/158 |
| 4,785,879 A | 11/1988 | Longsworth et al. | |
| 4,854,380 A | 8/1989 | Yoshida et al. | |
| 4,880,055 A | 11/1989 | Niggemann et al. | |
| 5,033,542 A | 7/1991 | Jabs | |
| 5,123,242 A | 6/1992 | Miller | |
| 5,243,815 A | 9/1993 | Maier et al. | |
| 5,363,654 A | 11/1994 | Lee | |
| 5,511,613 A | 4/1996 | Mohn et al. | |
| 5,544,700 A * | 8/1996 | Shagoury | F02C 7/14 165/139 |
| 5,775,412 A | 7/1998 | Montestruc, III et al. | |
| 5,820,654 A * | 10/1998 | Gottzman | B01D 53/229 95/39 |
| 6,422,306 B1 | 7/2002 | Tomlinson et al. | |
| 6,945,320 B2 | 9/2005 | Harvard, Jr. et al. | |
| 7,255,159 B2 | 8/2007 | Sagasser et al. | |
| 7,343,965 B2 | 3/2008 | Memory et al. | |
| 7,377,100 B2 | 5/2008 | Bruno et al. | |
| 7,779,898 B2 * | 8/2010 | Morrison | F28C 1/14 165/150 |
| 7,784,528 B2 | 8/2010 | Ottow et al. | |
| 7,861,512 B2 | 1/2011 | Olver et al. | |
| 8,266,888 B2 | 9/2012 | Liu | |
| 8,266,889 B2 | 9/2012 | Coffinberry | |
| 8,381,803 B2 | 2/2013 | Kim et al. | |
| 8,708,036 B2 | 4/2014 | Ikeda | |
| 8,826,970 B2 | 9/2014 | Shiraichi et al. | |
| 9,249,730 B2 | 2/2016 | Bourassa et al. | |
| 2002/0005275 A1 | 1/2002 | O'Donnell et al. | |
| 2003/0131978 A1 | 7/2003 | Nakano | |
| 2004/0069470 A1 | 4/2004 | Gorbulsky | |
| 2005/0150970 A1 | 7/2005 | Beutin et al. | |
| 2008/0095611 A1 | 4/2008 | Storage et al. | |
| 2011/0024093 A1 | 2/2011 | Shiraichi et al. | |
| 2013/0020047 A1 | 1/2013 | Army, Jr. et al. | |
| 2013/0180696 A1 | 7/2013 | Magee et al. | |
| 2014/0027099 A1 | 1/2014 | Sispera et al. | |
| 2014/0116664 A1 | 5/2014 | Landre | |
| 2014/0208768 A1 | 7/2014 | Bacic | |
| 2015/0377135 A1 | 12/2015 | Kupiszewski | |

FOREIGN PATENT DOCUMENTS

| | | |
|---|---|---|
| EP | 0777094 A2 | 6/1997 |
| EP | 1098156 A1 | 5/2001 |
| EP | 1555406 A1 | 7/2005 |
| EP | 2088371 A2 | 8/2009 |
| EP | 2711652 A1 | 3/2014 |
| EP | 2735791 A1 | 5/2014 |
| EP | 2811249 A1 | 12/2014 |
| ES | 2158731 T3 | 9/2001 |
| GB | 400557 A | 10/1933 |
| GB | 581742 A | 10/1946 |
| GB | 2217828 A | 11/1989 |
| JP | 11325753 A | 11/1999 |
| JP | 2003166792 A | 6/2003 |
| JP | 2004037020 A | 2/2004 |
| JP | 2006002622 A | 1/2006 |
| JP | 2012117544 A | 6/2012 |
| JP | 2014025695 A | 2/2014 |

OTHER PUBLICATIONS

A European Search Report and Opinion issued in connection with Related EP Application No. 15173911.7 dated Nov. 30, 2015.
A European Search Report and Opinion issued in connection with Related EP Application No. 15173866.3 dated Dec. 11, 2015.
A Japanese Office Action issued in connection with Related JP Application No. 2015128237 dated Aug. 2, 2016.
US Notice of Allowance issued in connection with Related U.S. Appl. No. 14/713,363 dated Jun. 14, 2017.
Michael Thomas Kenworthy et al., filed Mar. 25, 2016, U.S. Appl. No. 15/081,025.
Thomas Kupiszewski, filed Jun. 18, 2015, U.S. Appl. No. 14/742,970.
Ramon Martinez et al., filed May 15, 2015, U.S. Appl. No. 14/713,363.

* cited by examiner

TUBE IN CROSS-FLOW CONDUIT HEAT EXCHANGER

FIELD OF THE INVENTION

The present invention relates to a heat exchanger system that uses a cooling fluid flowing in tubes with the hot fluid path flowing through a conduit and routed in cross-flow over the exterior of the tubes.

BACKGROUND OF THE INVENTION

In an aircraft design, a continuous flow of hot air is bled from one part of a gas turbine engine, cooled, and provided to a specific user application. A heat exchanger system may be used to cool the hot bleed air.

The preferred medium for cooling hot bleed air is engine bypass air that flows through the gas turbine fan duct. There are several limitations on the design of the heat exchanger system that exchanges heat between the bleed air and the bypass air. The inlet manifold that brings the hot bleed air to the heat exchanger, the heat exchanger itself, and the outlet manifold that transports the cooled bleed air away from the heat exchanger cannot together impose too great a pressure drop, or the cooled bleed air that reaches the user application will have insufficient pressure to perform properly. The heat exchanger itself cannot impose too great a pressure drop on the engine bypass air flowing through the fan duct, or the bypass air will have insufficient pressure to perform properly. Weight and size also impose tight limitations. As with all aircraft structures, it is important to keep the weight of heat exchanger system as low as possible. The heat exchanger system also cannot significantly increase the envelope size of the gas turbine engine, and desirably is as small as possible to leave installation space for other aircraft systems.

Deflections and dimensional changes are potential concerns in the heat exchanger. The deflections result from two sources. The components of the heat exchanger deflect due to the pressure and vibratory mechanical loadings that occur as the gas turbine engine is powered. The components of the engine and heat exchanger also change size as their temperatures vary during use. These dimensional changes must be accounted for in the heat exchanger structure, or otherwise the resulting stresses and strains would lead to premature failure of the heat exchanger unit. The thermally induced stresses and strains are particularly a concern for the heat exchanger system, where gases of different temperatures are in close proximity, and the relative temperature of the gases changes over time.

There is a need for a compact, lightweight heat exchanger system that cools the flow of hot bleed air.

BRIEF DESCRIPTION OF THE INVENTION

Aspects and advantages of the invention will be set forth in part in the following description, or may be obvious from the description, or may be learned through practice of the invention.

A heat exchanger is generally provided that includes, in one embodiment, an input cavity defined by inlet cavity walls; a heat exchanger portion in fluid communication with the input cavity and defined between a first side and a second side, and wherein a plurality of baffles are positioned within the heat exchanger portion; and an outlet cavity in fluid communication with the heat exchanger portion and defined by outlet cavity walls. The heat exchanger portion comprises: a plurality of first fluid paths defined between the baffles and extending from the input cavity to the outlet cavity, and a plurality of tubes extending through the heat exchanger portion from the first side to the second side. Each tube extends through the baffles so as to define a second fluid path through the heat exchanger portion.

Heat exchanger systems are also generally provided. In one embodiment, the heat exchanger system comprises at least two heat exchangers (such as described above) serially connected to each other with respect to the first flow path and serially connected to each other with respect to the second flow path.

Methods are generally provided for cooling a hot fluid input with a heat exchanger. In one embodiment, the method comprising: directing the hot fluid input into an input cavity defined by inlet cavity walls; directing the hot fluid input into a heat exchanger portion in fluid communication with the input cavity and defined between a first side and a second side; directing the hot fluid input into an outlet cavity in fluid communication with the heat exchanger portion and defined by outlet cavity walls; and directing a cooling fluid through a plurality of tubes extending through the heat exchanger portion from the first side to the second side. A plurality of baffles are positioned within the heat exchanger portion, with a plurality of first fluid paths defined between the baffles. Each tube extends through the baffles so as to define a second fluid path through the heat exchanger portion.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1A:
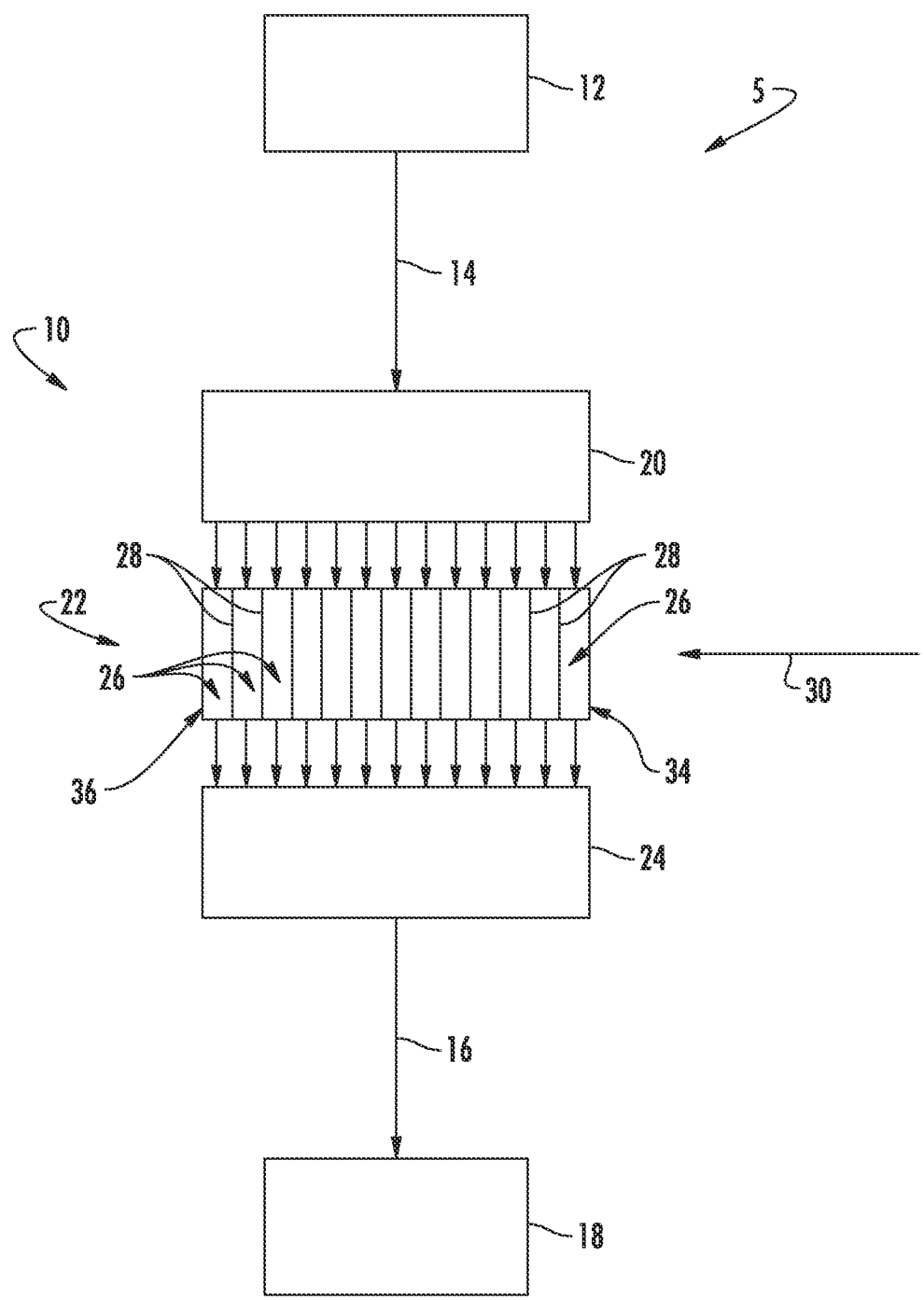
FIG. 1A is a schematic representation of an exemplary heat exchanger system, according to one embodiment.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, a "fluid" may be a gas or a liquid. The present approach is not limited by the types of fluids that are used. In the preferred application, the cooling fluid is air, and the cooled fluid is air. The present approach may be used for other types of liquid and gaseous fluids, where the cooled fluid and the cooling fluid are the same fluids or different fluids. Other examples of the cooled fluid and the cooling fluid include hydraulic fluid, fuel, oil, combustion gas, refrigerant, refrigerant mixtures, dielectric fluid for cooling avionics or other aircraft electronic systems, water, water-based compounds, water mixed with antifreeze additives (e.g., alcohol or glycol compounds), and any other organic or inorganic heat transfer fluid or fluid blends capable of persistent heat transport at elevated temperature.

A heat exchanger system is generally provided that includes performance-enhancing geometries whose practical implementations are facilitated by additive manufacturing. Although the heat exchanger system described herein is broadly applicable to a variety of heat exchanger applications involving multiple fluid types, it is described herein for its high-effectiveness cooling of jet engine compressor bleed air flow by lower pressure fan duct air flow.

A recurring physics-based design challenge is that the prevailing thermodynamic state and flow conditions typically cause the external heat-sinking flow to be the heat transfer-limiting flow, not the hot pressurized bleed air which conventionally flows inside the heat exchanger. Because the fan air temperature and density are relatively low compared to the compressor bleed air, the fan air convection heat transfer coefficients tend to be relatively low, particularly at high altitude operating conditions, and there also tends to be more fan air temperature rise per unit of heat absorbed. The relatively greater temperature rise along the fan air flow reduces the differential temperature potential for cooling the compressor bleed air. Combined, both affects conspire to limit heat exchanger effectiveness per unit of surface area wetted by the fan air flow. Effectiveness increases with surface area, but the improvement diminishes asymptotically such that heat exchanger size increments become impractical and outlet pressure decrements become untenable.

However, the heat exchanger system described herein overcomes that limitation in a variety of ways. First, the heat exchanger has a geometric topology inversion in which the cooling air flow transits the heat exchanger interior within tubes while the cooled air flow is external to the tubes. Second, the heat exchanger is an additive-facilitated, fully open, well-regimented cellular geometry (see e.g., FIG. 2B) characterized by high surface area to volume ratio with tailored flow constrictions. Combined, both of these features compensate for the relatively low heat sinking capacity of the fan flow by establishing a compact heat transfer surface array facilitating enhanced convection rates on both cooled and heated sides.

FIG. 1A schematically represents a heat exchanger system 5, according to one exemplary embodiment, including a heat exchanger 10. Hot air input 12 enters the system 10 via an inlet manifold 14 and exits the system 10 via an outlet manifold 16 as cooled air output 18. The hot air input 12 is typically bled from a portion of the engine core, where it is available at the temperature and pressure of interest. Generally, the pressure of the hot air flow through and out of the heat exchanger system 10 can be controlled so as to reduce the pressure drop of the hot air input 12 to the cooled air output 18.

In the embodiment shown, the heat exchanger 10 includes an input cavity 20 in fluid communication with the inlet manifold 14 such that the hot air input 12 flows into the input cavity 20 upon entering the heat exchanger 10. From the input cavity 20, the hot air flows into and through a heat exchanger portion 22 to reduce the temperature of the hot air input. Then, the cooled air output 18 flows into an outlet cavity 24 before exiting the heat exchanger 10 via the outlet manifold 16.

The heat exchanger portion 22 includes a plurality of high pressure paths 26 defined between baffles 28 and extending from the input cavity 20 to the outlet cavity 24. The baffles 28 provide structural support for the heat exchange portion 22 including the conduit and the tubes 42. The high pressure paths 26 allow the hot air input 12 to flow through the heat exchanger portion 22 to be converted to the cooled air output 16. Cooling is achieved utilizing a cooling fluid 30 passing through the heat exchanger portion 22 via the low pressure cooling flow paths 32 (FIGS. 1B and 1C) that extend from a first side 34 to a second side 36 of the heat exchanger portion 22. As such, the cooling fluid 30 flows through the heat exchanger portion 22 perpendicular to the high pressure paths 26 and the baffles 28. The cooling air 30 can be from any source having a temperature and pressure that are lower than the hot air input 12. For example, the cooling air 30 can be sourced from bypass air, FLADE air, or compressor air bleed (such as from a low pressure stage).

Figure 1B:
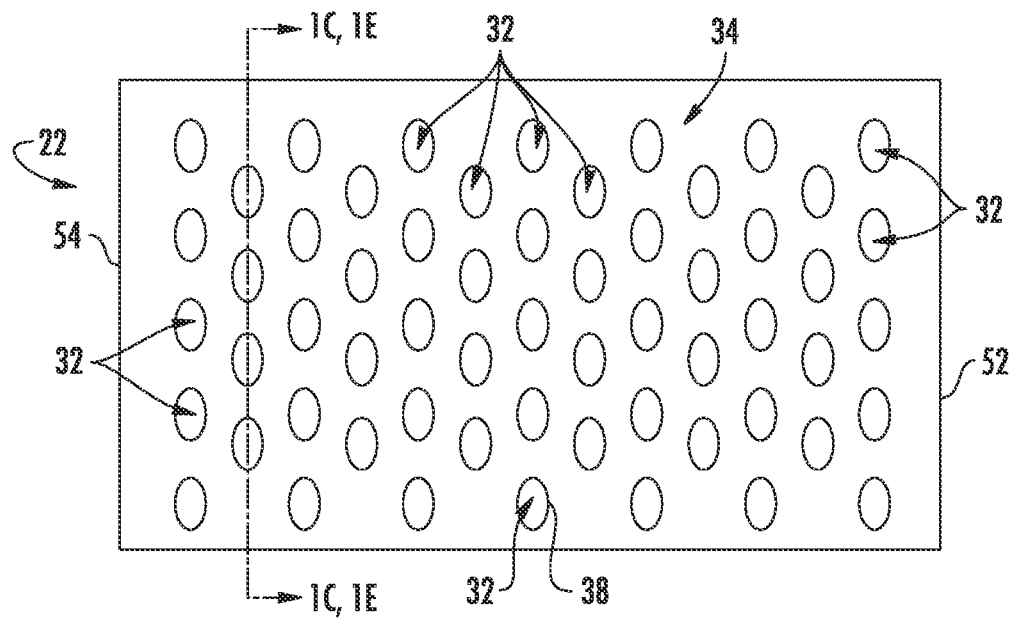
FIG. 1B shows a side view of the heat exchanger portion of the heat exchanger system shown in FIG. 1A.
Figure 1C:
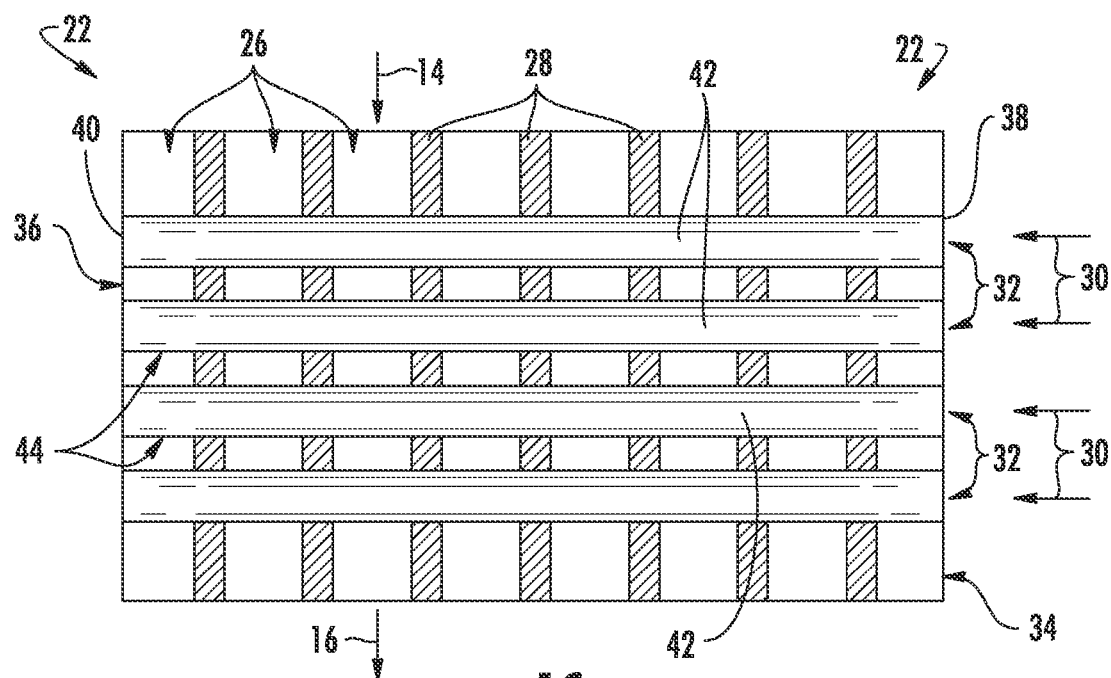
FIG. 1C shows a cross-sectional view of the heat exchanger portion according to one embodiment of FIG. 1B.

As shown in FIGS. 1B and 1C, the cooling flow paths 32 are defined from the tube inlet 38 defined in the first side 34 to an oppositely positioned tube outlet 40 defined in the second side 36. A tube 42 extends from the tube inlet 38 defined in the first side 34 through the entire length of the heat exchanger portion 22 to the tube outlet 40 defined in the second side 36. The tube 42 serves as a passage for the cooling fluid 30 to flow through the cooling flow path 32 from the tube inlet 38 to the tube outlet 40. FIG. 1C shows that the tube 42 extends through the internal baffles 28 defining the high pressure paths 26. That is, the internal baffles 28 also define cavities allowing the tubes 42 to extend therethrough.

As stated, the high pressure paths 26 are defined by the internal space between the baffles 28 and extend from the input cavity 20 to the outlet cavity 24 with the tubes 42 extending through the high pressure paths 26 without preventing flow therethrough. Thus, the hot air passing through the high pressure paths 26 contacts the external surface of the tube wall 44 of the tubes 42, allowing for heat exchange between the hot air of the high pressure path 26 and the cooling fluid 30 within the cooling flow path 32 defined by the tube 42, while preventing any fluid mixing between the high pressure paths 26 and the cooling fluid 30.

Figure 1D:
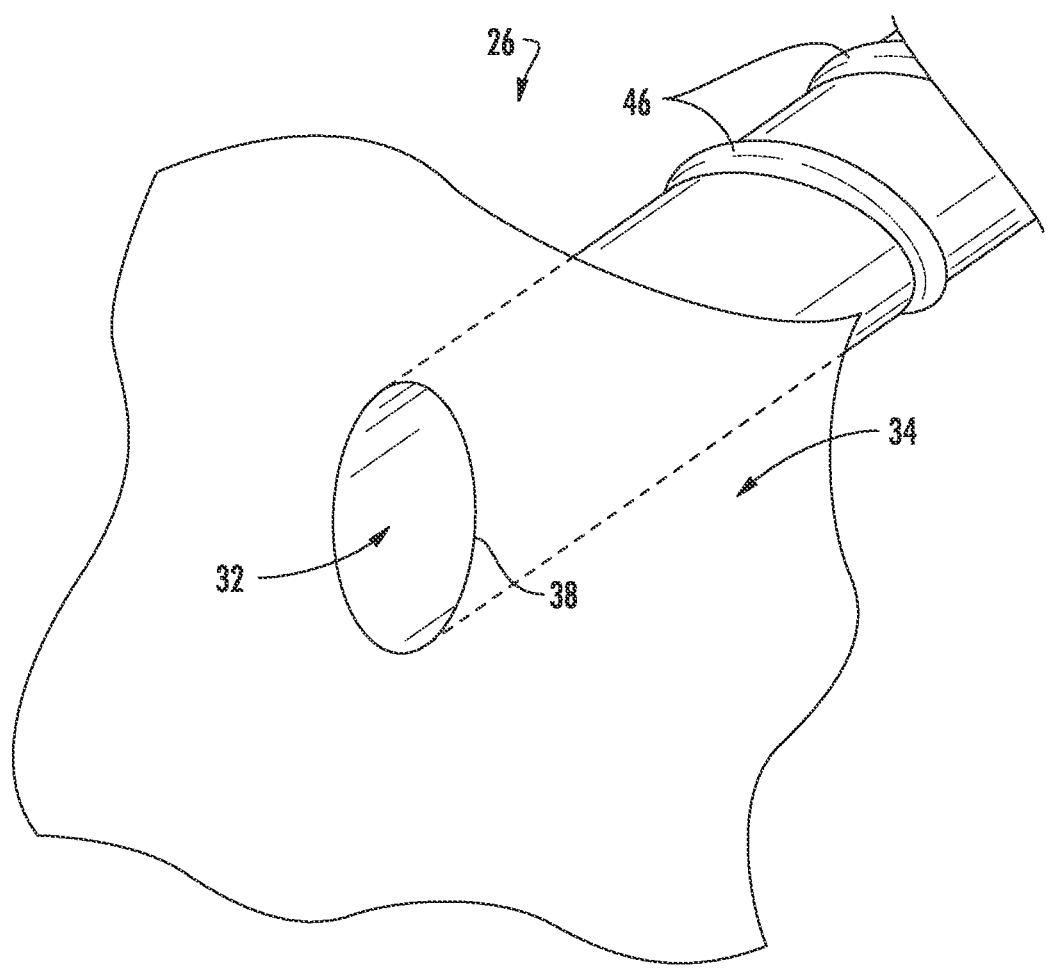
FIG. 1D shows an exploded cut-away view of an exemplary tube of the heat exchanger portion shown in FIG. 1B.
Figure 1E:
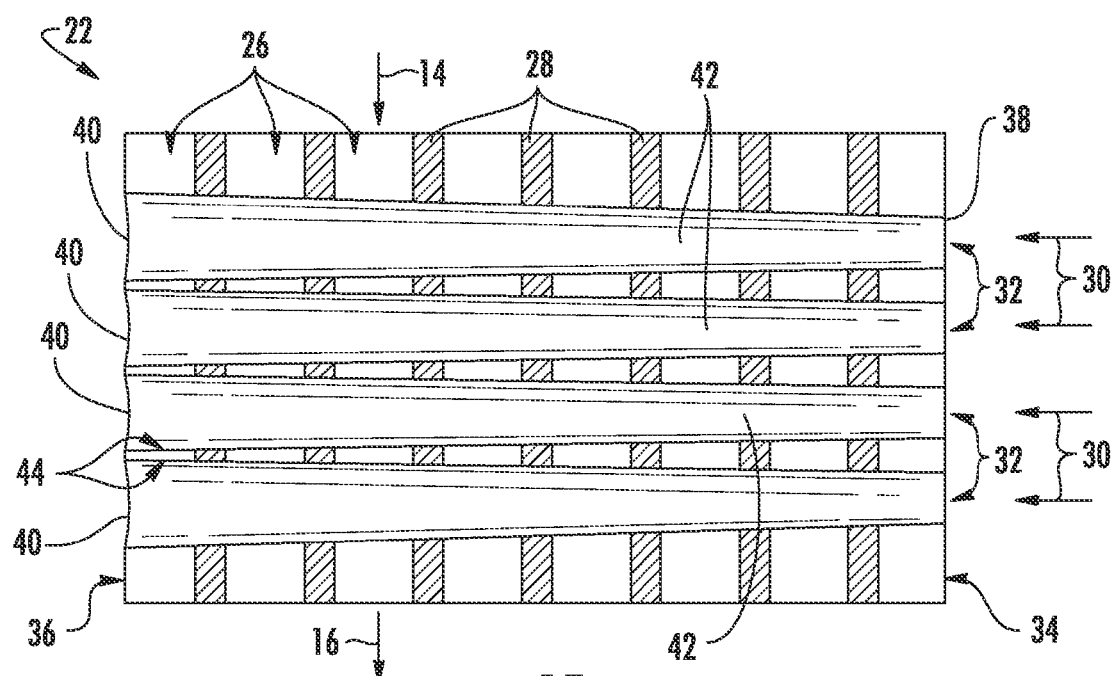
FIG. 1E shows a cross-sectional view of the heat exchanger portion according to another embodiment of FIG. 1B.

Referring to FIG. 1E, another embodiment of the heat exchanger portion 22 with variable diameter size tubes 42. In the embodiment shown, the cooling flow paths 32 expand in average diameter from the tube inlet 38 defined in the first side 34 to the tube outlet 40 defined in the second side 36. The expanding area of the tube 42 can, in particular embodiments, slow the flow of the cooling fluid 30 through the cooling flow paths 32. Although shown as a constantly expanding tube 42 (e.g., having a conical shape), any suitable expansion shape can be utilized (e.g., stepped, piecewise linear, curvilinear, etc.). In alternative embodiments, the tubes 42 can change in average diameter from the tube inlet 38 defined in the first side 34 to the tube outlet 40 defined in the second side 36, according to a continuously variable shape profile.

The embodiment shown in FIG. 1E has the tubes 42 expanding on its elongated, major axis (perpendicular to the cooling path 30 and parallel with the direction of flow of the high pressure path 26 from inlet manifold 14 to outlet manifold 16) and optionally also on its minor axis (perpendicular to the cooling path 30 and to the direction of flow of the high pressure path 26 from inlet manifold 14 to outlet manifold 16.

Figure 1F:
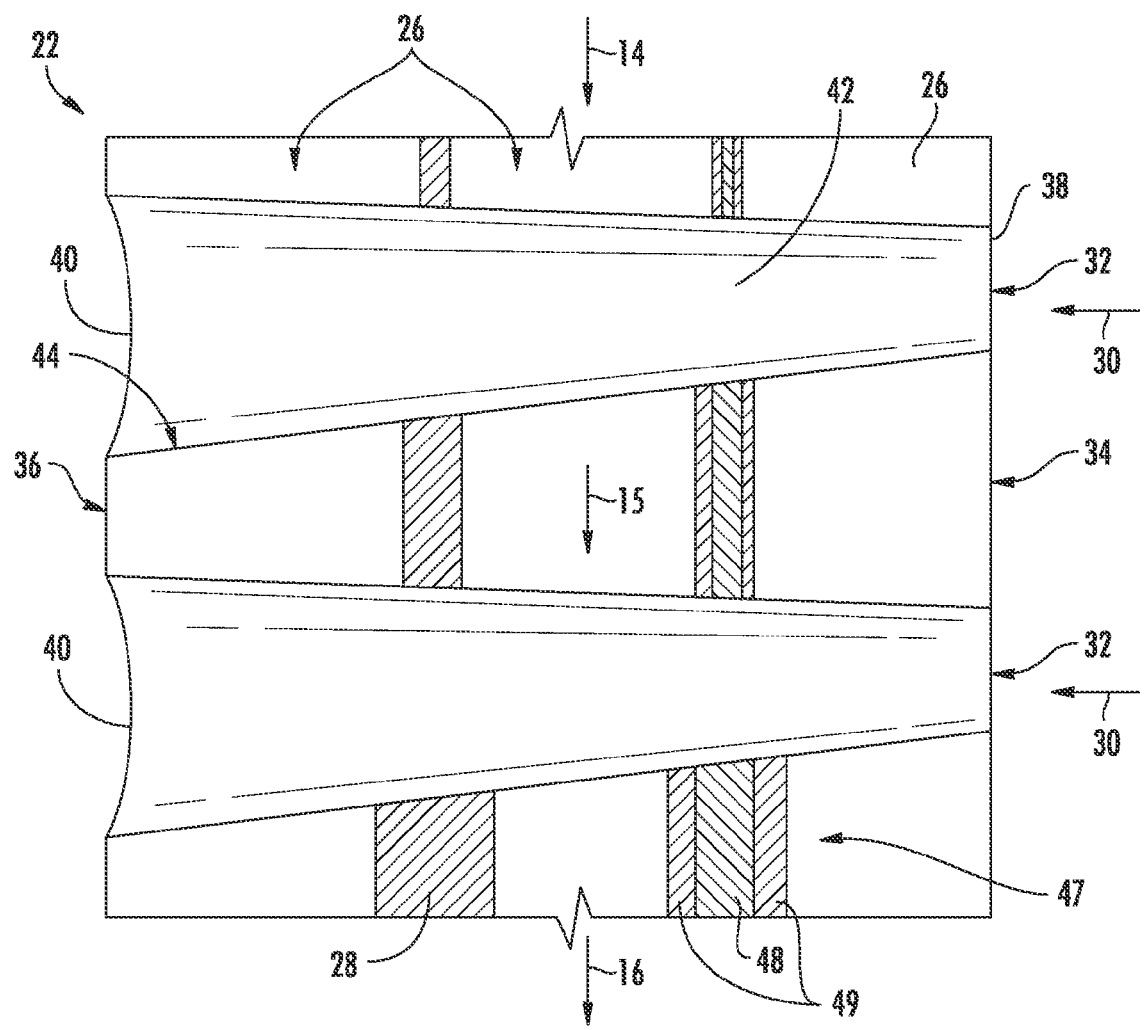
FIG. 1F shows a cross-sectional view of the heat exchanger portion according to another embodiment of FIG. 1B.

FIG. 1F shows an embodiment of the heat exchanger portion 22 with variable diameter size tubes 40 and variable size baffles 28 with respect to their thickness. In the embodiment shown, the baffles 28 have an increasing thickness in the direction of the flow of the high pressure path 26, thus decreasing the volume of the high pressure path 26 from the input cavity 20 to the outlet cavity 24. That is, the flow cross-sectional area of the high pressure path 26 at the input cavity 20 does not equal the flow cross-sectional area of the high pressure path 26 at the output cavity 24, which is smaller than the flow cross-sectional area of the high pressure path 26 at the input cavity 20 as shown in the embodiment of FIG. 1F. As shown, each baffle 28 defines an inlet cross-section area at the inlet cavity and an outlet cross-section area at the outlet cavity, with the inlet cross-section area being different (i.e., larger) than the outlet cross-section area.

FIG. 1F also shows that the heat exchanger portion 22 includes at least one composite baffle 47 formed from a core 48 and skin layers 49. As such, different materials can be layered to form the baffles 28 as the composite laminate construction comprised of one or more heat-shunting, high thermal conductivity inner core layer(s) 48 sandwiched amongst outer skin layers 49 comprised of the same higher strength lower thermal conductivity material as the tube walls 44. For example, the composite baffles 47 can be made of a bi-metallic composition. In addition, mass diffusion barriers may also be inserted between the skin layers 49 and the core layer(s) 48. In addition to additive methods, the inner core layer may be established by a variety of film coating methods such as cold spray, thermal spray, plasma spray, chemical vapor deposition, sputtering, or plating. Material options include, but are not limited to, diamond, boron nitride, noble metals, bronze alloys, or mixtures thereof.

The tubes 40 can define a substantially straight cooling flow path 32 through the heat exchanger portion 22. In other embodiments, the tubes 40 can define a non-straight cooling flow path 32 (e.g., bent, curved, looped, helical, serpentine, sinusoidal, etc.).

Figure 9:
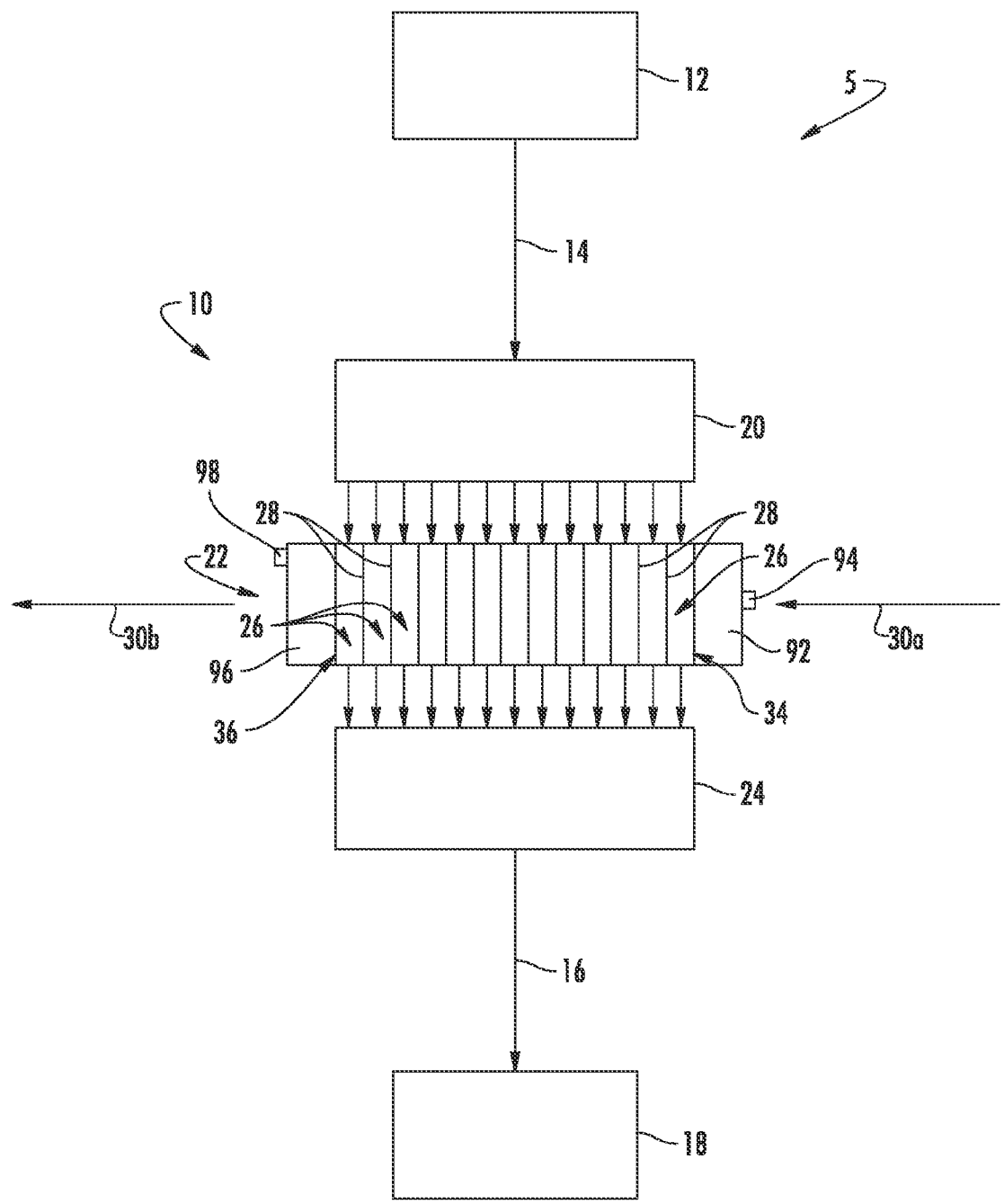
FIG. 9 is a schematic representation of an exemplary heat exchanger system, according to one embodiment.

In one embodiment, as shown in FIG. 9, the cooling fluid 30a can first enter an input cavity 92 via input supply 94 prior to flowing through cooling flow paths 32 defined within the tubes 40. Additionally, the exiting cooling fluid 30b can first enter an output cavity 96 and exit via output supply 98. Such embodiments are particularly useful when the cooling fluid is redirected into and through the heat exchanger portion 22 and/or for a liquid cooling fluid.

Generally, the heat exchanger 10, and particularly the heat exchanger portion 22, is formed via manufacturing methods using layer-by-layer construction or additive fabrication including, but not limited to, Selective Laser Sintering (SLS), 3D printing, such as by inkjets and laser beams, Stereolithography, Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), and the like. Materials used to form the heat exchanger include (but are not limited to): pure metals, nickel alloys, chrome alloys, titanium alloys, aluminum alloys, aluminides, or mixtures thereof. As stated, the baffles 28 can be constructed from a material pairing(s) so as to enhance the heat exchange properties of the tubes 42 by augmenting the fin effect of the baffles As stated, the cooling air 26 passing through the cooling flow paths 32 is at a pressure that is less than the pressure of the hot air passing through the high pressure paths 26. The tubes 42 are reinforced by the integral baffles 28 to inhibit and prevent collapsing of the cooling flow paths 32. The substantially oval shape of the tubes 42 (from the tube inlet 38 to the tube outlet 40) enables higher surface area per unit pressure drop of the exterior flow. However, other shapes can be utilized to form the cross-section of the tubes 42, including, but not limited to, circles, squares, rectangles, triangles, pentagons, hexagons, etc.

In particular embodiments, such as shown in FIG. 1D, a flow turbulating element 46 can be positioned on the internal and/or external surface of the tube wall 44 to turbulate fluid flow through, respectively, the low pressure cooling path 32 and/or the high pressure path 26. The flow turbulating element 46 can be any suitable structure, such as a step, flange, swirler, spine, fin, concave dimple, convex dimple, vane, winglet, helical ridge, helical groove, etc.

Figure 2A:
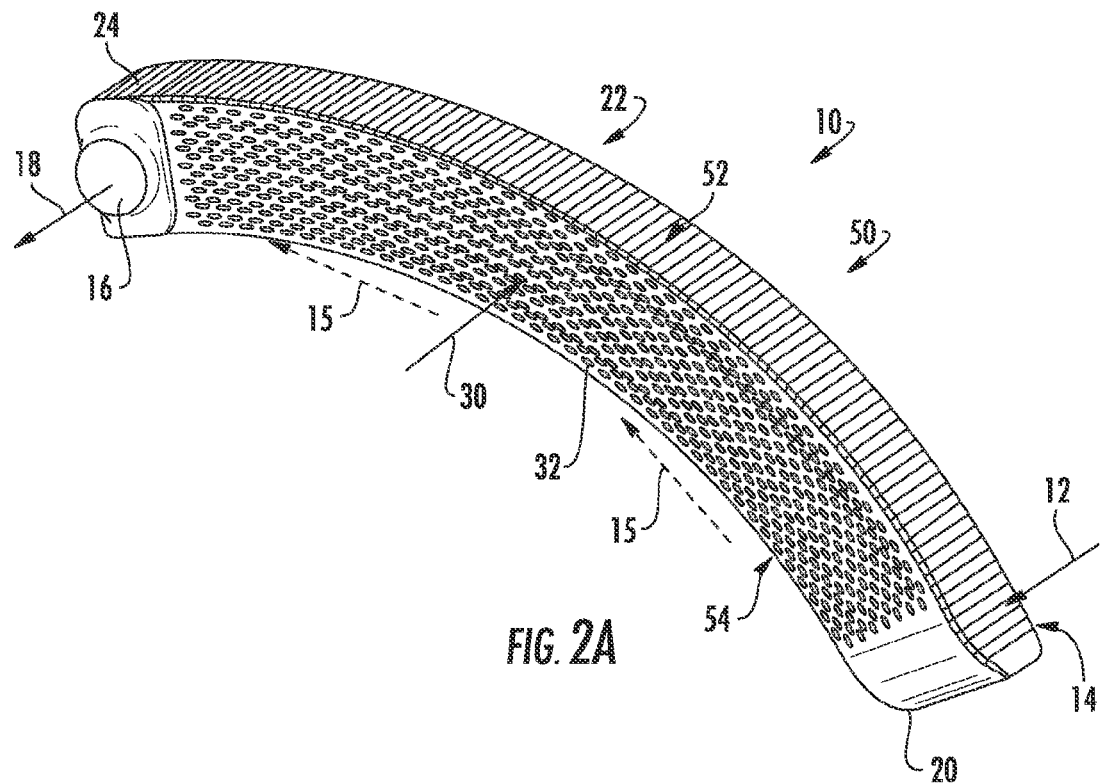
FIG. 2A shows a heat exchange system formed from an exemplary single, integrated component, according to one embodiment.
Figure 2B:
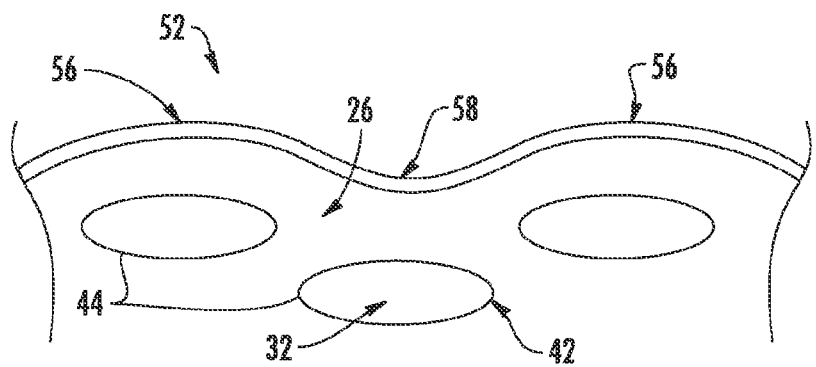
FIG. 2B shows an exploded view of the cross-section of the top portion of the exemplary heat exchange system of FIG. 2A.

In one embodiment, the heat exchanger 10 is formed from an integrated component. For example, FIGS. 2A and 2B show an exemplary heat exchanger system 10 formed from a single, integrated component 50 that includes each of the inlet manifold 14, input cavity 20, heat exchanger portion 22, output cavity 24, and outlet manifold 16 such that the hot air flow direction 15 is perpendicular to the low pressure cooling paths 32 defined by the tubes 42. The heat exchanger 10 of FIG. 2A is shown as an integrated component 50 formed via additive manufacturing. As shown, the heat exchanger system 10 of this embodiment has a curved shape for use as a part of a gas turbine engine such as the annular FLADE™ bypass air duct. As such, bypass air can be utilized as the cooling air 30. In other applications, the cooled fluid may be a liquid which flows within the conduit such that the bypass air also can be utilized as the cooling air 30. In this embodiment, the hot air input 12 may be bleed air from the engine.

As used herein, the term "conduit" refers to the outer containment structure defined by the single, integrated component 50 through which, for example, the high pressure path 26 is routed in cross-flow over the exterior of the tubes 40 that contain the low pressure cooling path.

The embodiment of FIG. 2A shows an air-to-air example, where the inputs of both the high pressure paths 26 and the low pressure cooling paths 30 are gaseous. For example, the high pressure paths 26 is sourced from bleed air from the engine, while the low pressure cooling paths 30 is sourced from FLADE air.

The top surface 52 and the bottom surface 54 of the integrated component 50 are textured to define peaks 56 and valleys 58 that generally correspond to the positioning and pattern of the tubes 42 therein. The texture surfaces 52, 54 (formed from the alternating peaks 56 and valleys 58) serve two functions. First and foremost, the textured surfaces 52, 54 reduce mal-distribution of the flow across the exterior surfaces of those tubes proximal to the conduit wall. That is, the textured surfaces 52, 54 create a more uniform flow path around all of the tubes. Otherwise, there is a tendency for the hot air to flow along the shell walls and degrade performance of the heat exchanger. Second, the textured surfaces 52, 54 provide a derivative benefit in that it supplementally reinforces (stiffens) the relatively large surfaces 52, 54 against outward deflection caused by the relatively high internal pressure within the high pressure flow path 26.

Figure 2C:
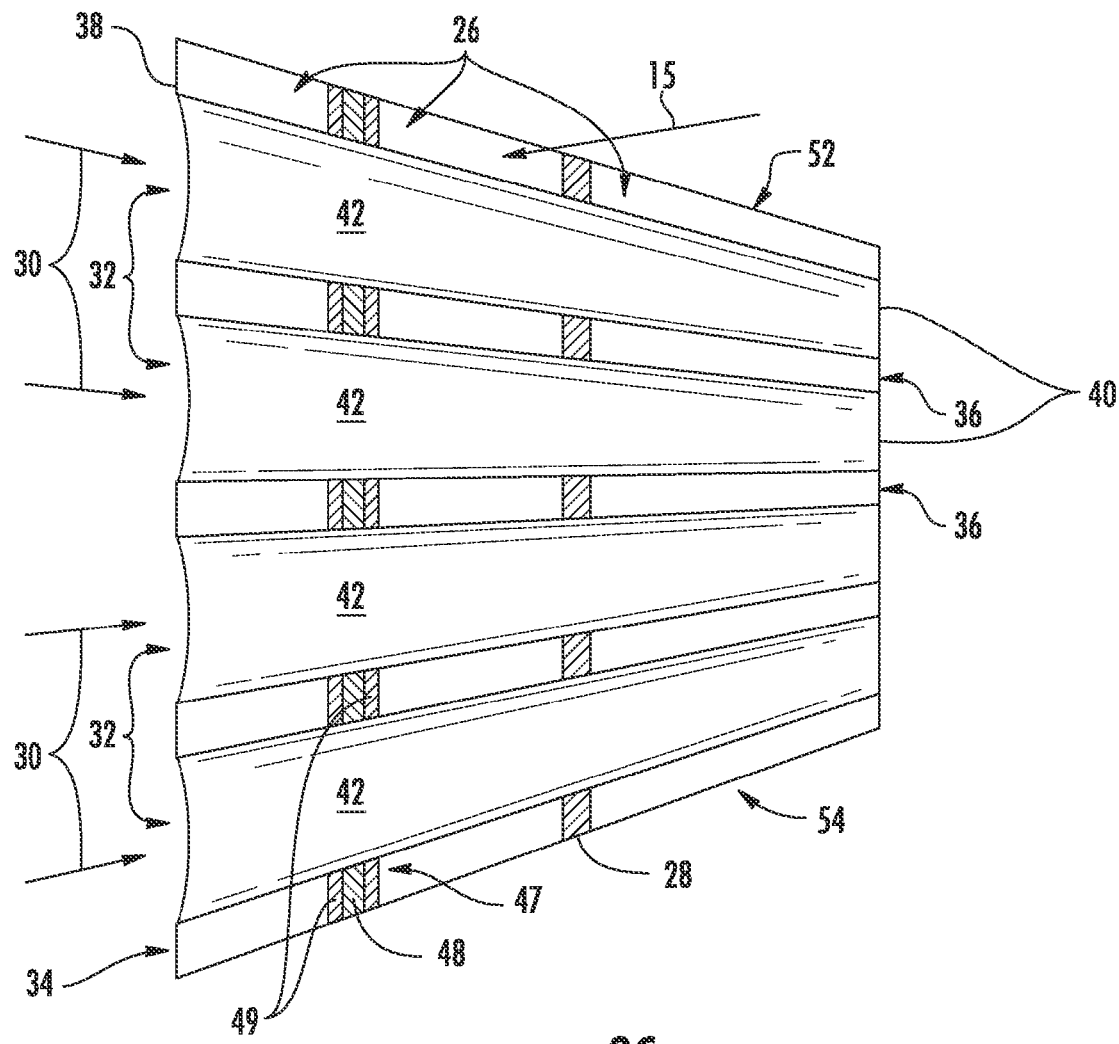
FIG. 2C shows an cross-section of the exemplary heat exchange system of FIG. 2A, according to one embodiment.

FIG. 2C shows a cross-section of the exemplary heat exchanger system 10 of FIG. 2A, according to one embodiment. As shown, at least one composite baffle 47 can be included, with a core 48 and skin layers 49 as discussed above. Additionally, to reduce weight, the cooling path 32 can be contracting in size from the first side 34 to the second side 36. Due to this contracting size of the cooling paths 32, and thus of the flow cross-sectional area of the tubes 42, the baffles 28 can be spaced at an increasing distance apart from the first side 34 to the second side 36 in one embodiment such that the volume of the high pressure paths 26 can be controlled (e.g., made to be substantially equal) even though the tubes 42 are smaller and spaced closer nearer the second side 36 than the first side 34.

Figure 3A:
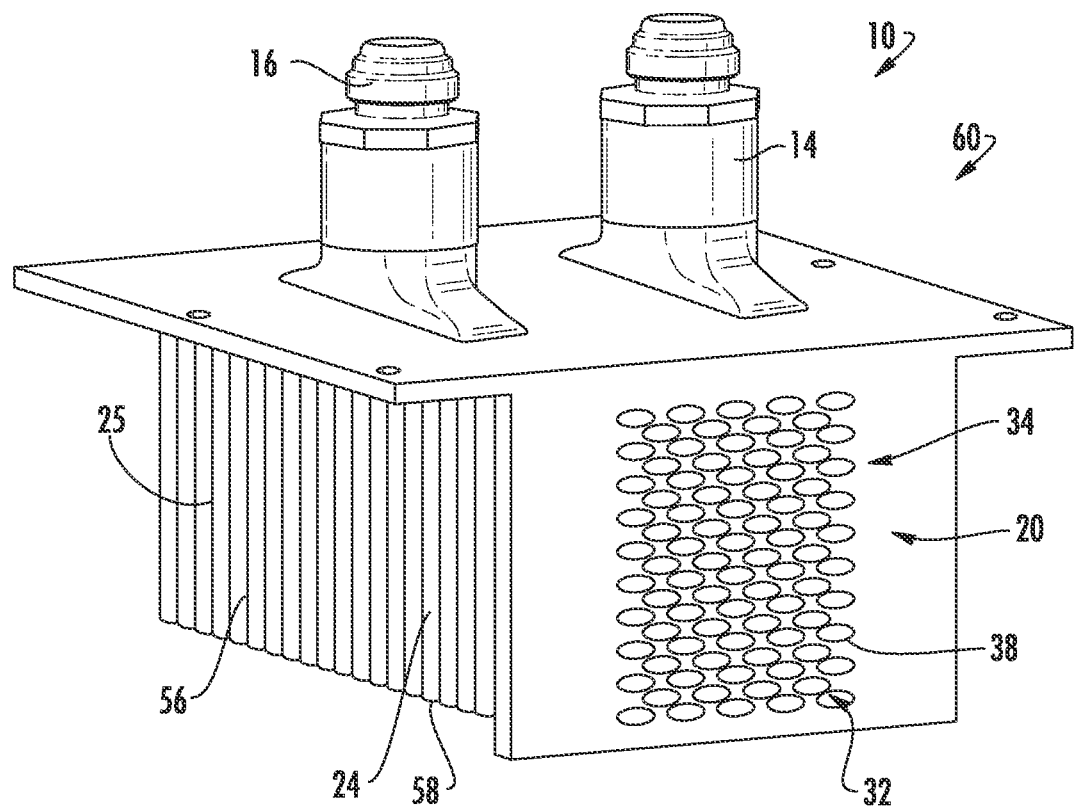
FIG. 3A shows a heat exchange system formed from an exemplary single, integrated component, according to another embodiment.
Figure 3B:
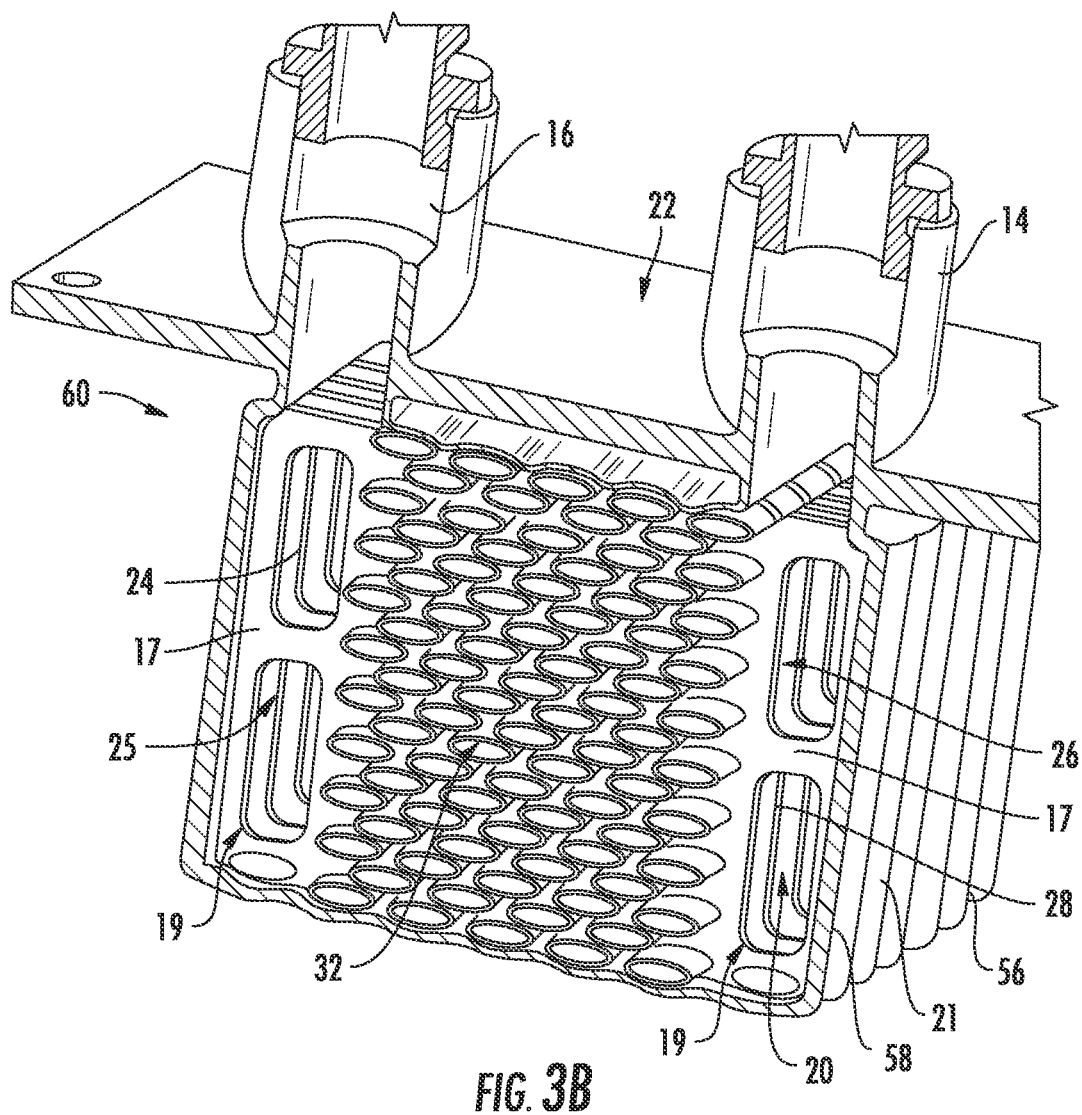
FIG. 3B shows a cut-away view of one cross-section of the exemplary heat exchange system of FIG. 3A.

FIGS. 3A and 3B show another exemplary embodiment of a heat exchanger system 10 formed from an integrated component 60. In this embodiment, the external wall 21 of the input cavity 20 and the external wall 25 of the output cavity 24 are texturized with peaks 56 and valleys 58. The textured nature of the external wall 21 and the external wall 25 reinforces the input cavity 20 and the output cavity 24, respectively, against outward deflection caused by the relatively high internal pressure within the input cavity 20 and the output cavity 24 forming the high pressure flow path 26.

FIG. 3B also shows cavity baffles 17 in both the input cavity 20 and the output cavity 24. The cavity baffles 17 define apertures 19 therein to allow fluid flow and mixing within the cavities 20, 24 while still providing strength to the overall structures. In one embodiment, the cavity baffles 17 can be connected to and parallel with the baffles 26 as an extension thereof. Additionally, the cavity baffles 17 can be constructed to direct flow into and out of the heat exchanger portion 22.

Figure 4A:
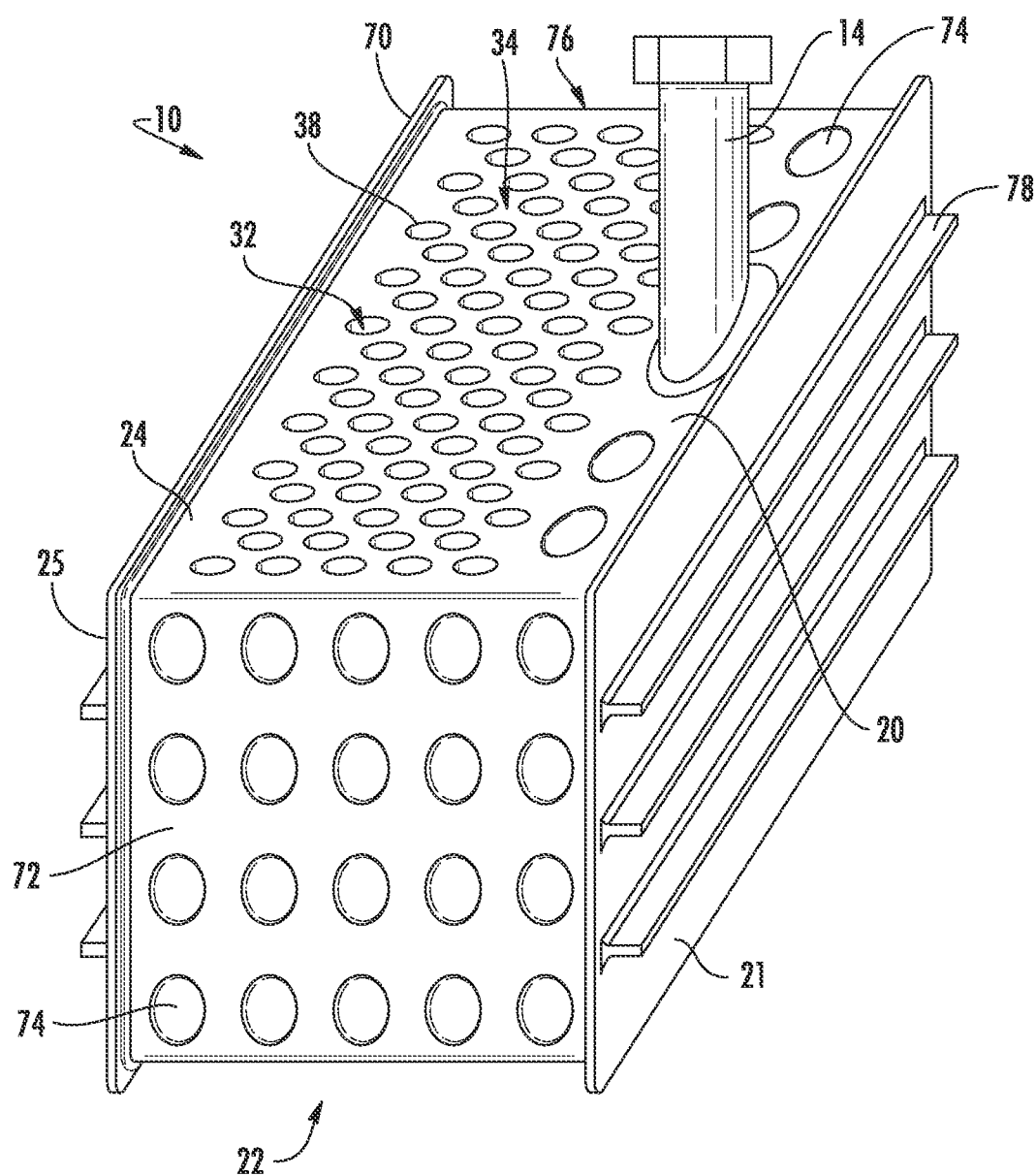
FIG. 4A shows a heat exchange system formed from an exemplary single, integrated component, according to yet another embodiment.
Figure 4B:
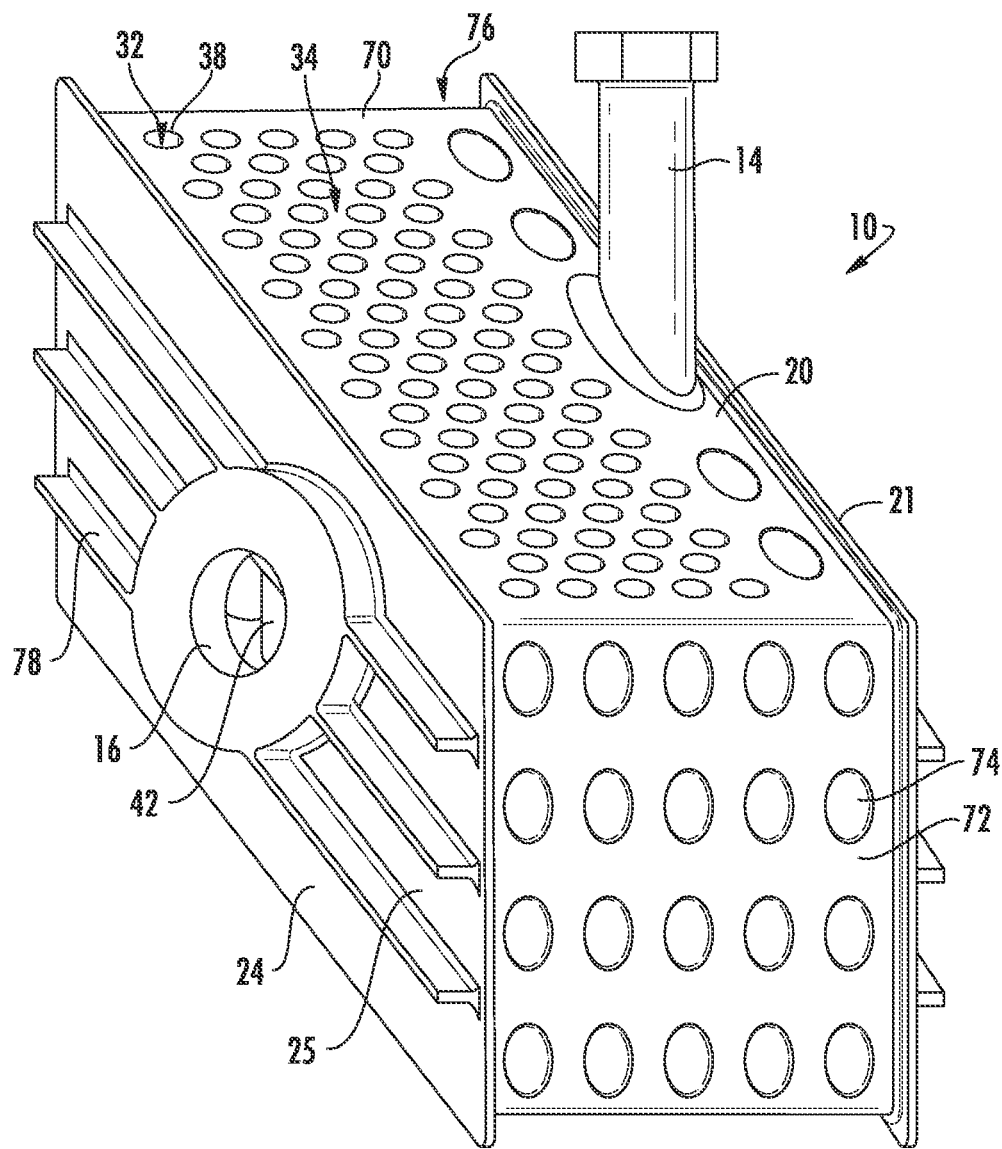
FIG. 4B shows a another view of the exemplary heat exchange system of FIG. 4A.
Figure 4C:
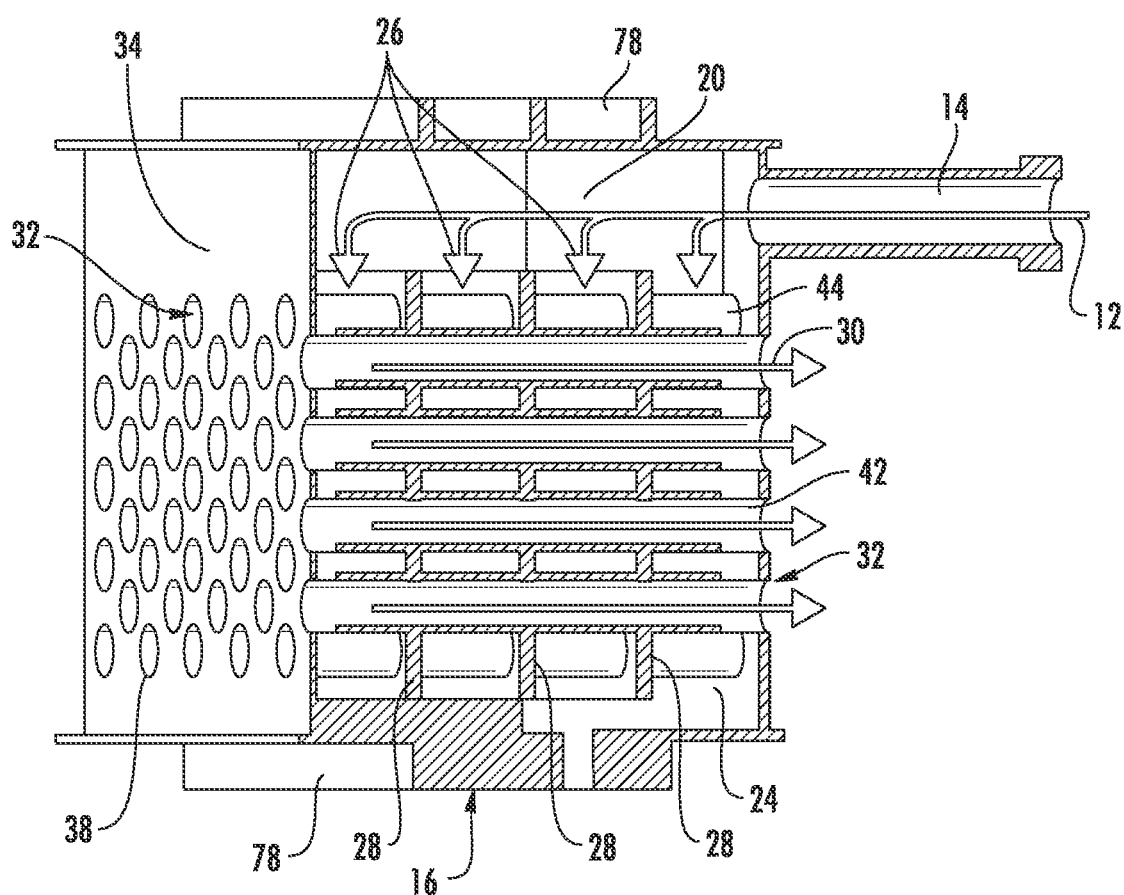
FIG. 4C shows a cut-away view of one cross-section of the exemplary heat exchange system of FIG. 4A.

FIGS. 4A-4C show another exemplary embodiment of a heat exchanger system 10 formed from an integrated component 70. The side wall 72 and side wall 74 define dimples 74 to create flow turbulation topology within the high pressure flow path 26 and to reinforce the relatively large side walls 72, 74 against outward deflection caused by the relatively high internal pressure within the high pressure flow path 26. Additionally, the dimples 74 also turbulate an external cool air flow around the side walls 72, 74 for additional heat exchange between the high pressure flow paths 26 through the external walls of the integrated component 70 and the external cool air flow passing outside of the integrated component 70. The external wall 21 of the input cavity 20 and the external wall 25 of the output cavity 24 include structural flanges 78 for reinforcement against outward deflection caused by the relatively high internal pressure within the input cavity 20 and output cavity 24, respectively.

As seen from the various embodiments, the shape of the heat exchanger 10 can be varied, along with the orientation of the inlet manifold 14 into the input cavity 20 can be any suitable direction as long as the high pressure flow path 26 and the low pressure cooling path are perpendicular to each other. However, flow path crossing angles other than 90 degrees are not precluded. Additionally, the structural integrity of the exterior walls (of the input cavity, heat exchange portion, and/or the output cavity) can be reinforced through a variety of structural elements (e.g., dimples, alternating peaks and valleys, flanges, etc.) utilized alone or in various combinations.

Figure 5:
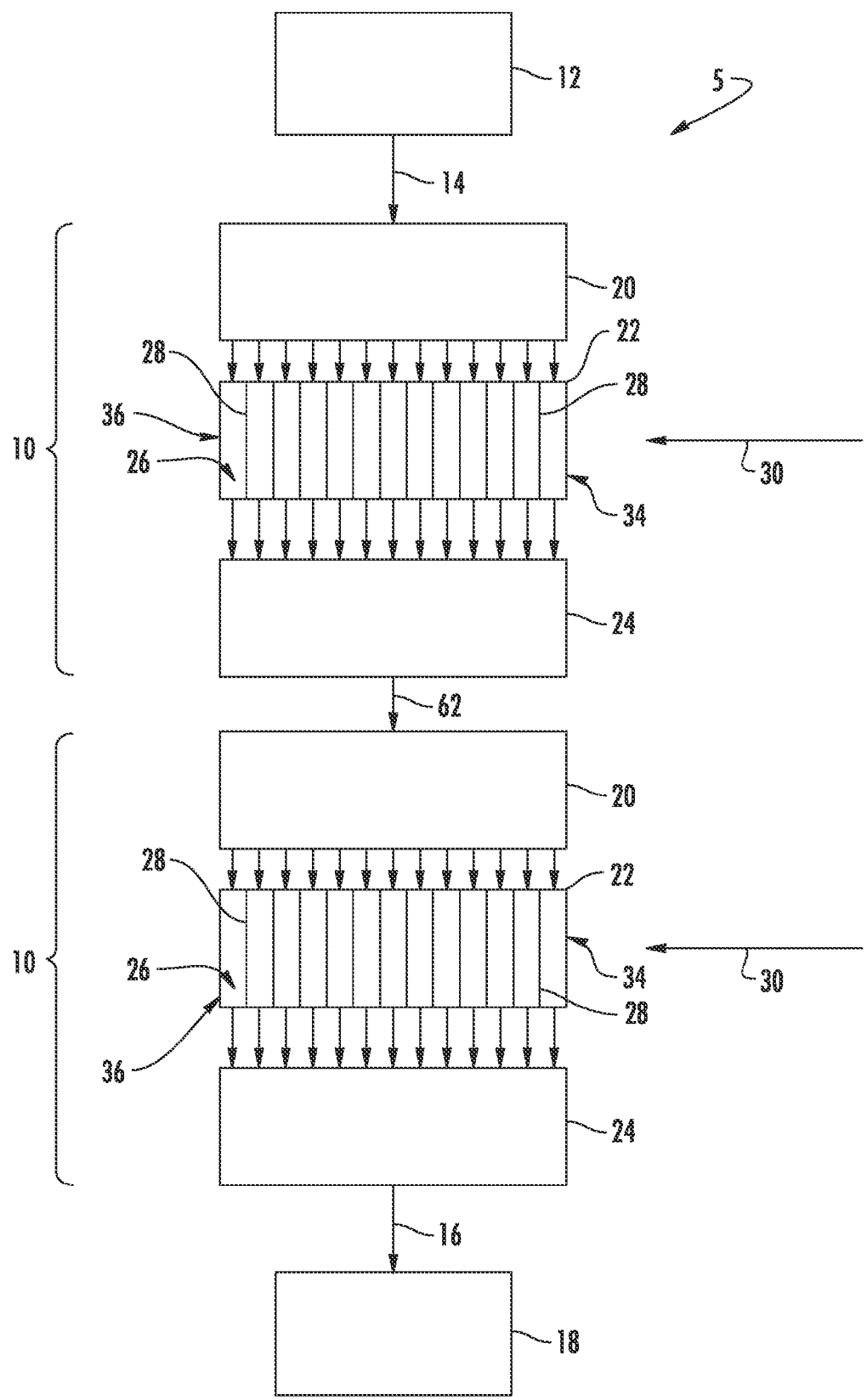
FIG. 5 shows a schematic representation of an exemplary heat exchanger system with more than one heat exchanger fluidly connected in series with respect to the high pressure flow path, according to one embodiment.

The present approach is compatible with the use of only a single heat exchanger, or multiple heat exchangers with their respective high pressure flow path 26 in fluid communication with each other. For example, FIG. 5 shows a heat exchange system 5 that includes two heat exchangers 10 (as in FIGS. 1A-1F) with the high pressure flow paths 26 connected in series through the connection manifold 62 such that the cooled air from the output cavity 24 of the first heat exchanger 10 passes through the connection manifold 62 to enter the input cavity 20 of the second heat exchanger for additional cooling.

Figure 6:
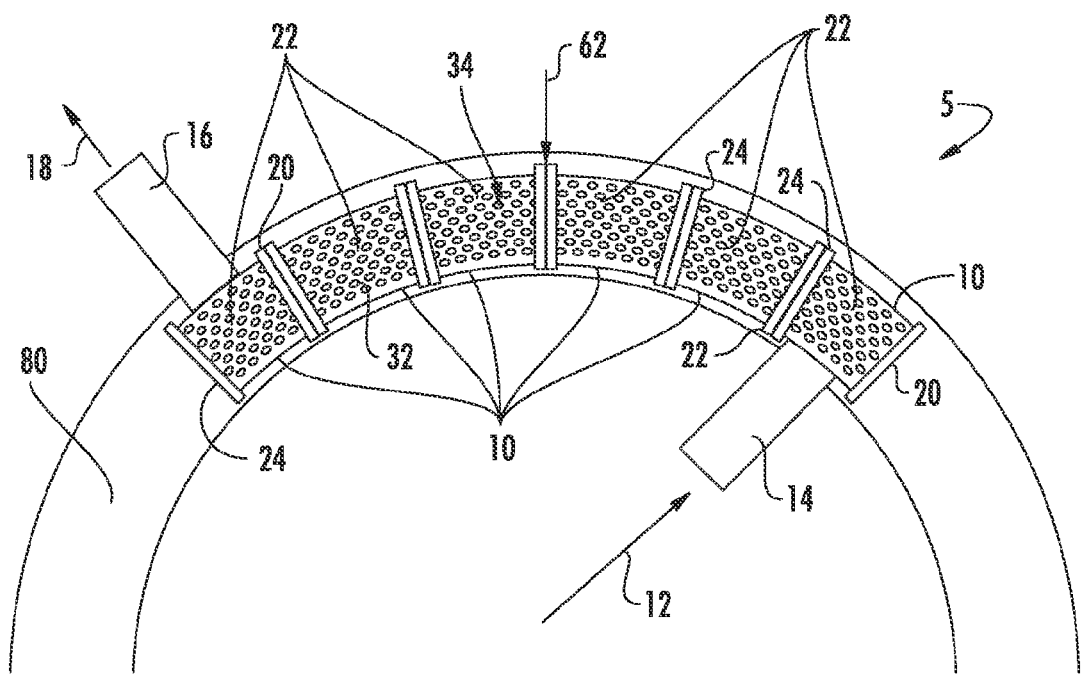
FIG. 6 shows a heat exchanger system formed from a plurality of heat exchangers arranged around a duct, according to one embodiment.

Referring to FIG. 6, a jet engine air duct 80 is shown as an annular forward-looking-aft orientation for certain jet engines. The series of heat exchangers 10 are fluidly connected in series and aligned along the duct 80 in its annular orientation. Alternatively, the heat exchanger 10 form of an exemplary single, integrated component 50 shown in FIG. 2A has an annular orientation for inclusion within the duct 80.

When multiple heat exchangers 10 are used in series, as shown in FIG. 6, the heat exchangers can be identical in composition in one embodiment. However, in an alternative embodiment, the heat exchangers 10 are different in terms of composition. For example, the first heat exchanger contacting the hot air input 12 at its highest temperature can be constructed of a relatively high temperature material (e.g., nickel-chromium based alloys such as available under the tradename Inconel® available from Special Metals Corporation, titanium, titanium alloys, etc.) due to the relatively high temperature of the hot air input 12. Then, in the subsequent, downstream heat exchangers 10 with respect to the high pressure path 26 can be constructed of more lightweight, lower temperature materials (e.g., aluminum, aluminum alloys, etc.) as the hot air is cooled after passing through at least one of the upstream heat exchangers. In such embodiments, the connection manifold 62 can establish a boundary across which the material of the heat exchangers can change. As such, the material can be selected based on a combination of the required strength, working temperatures, and weight requirements while allowing optimization of the overall system.

Figure 7:
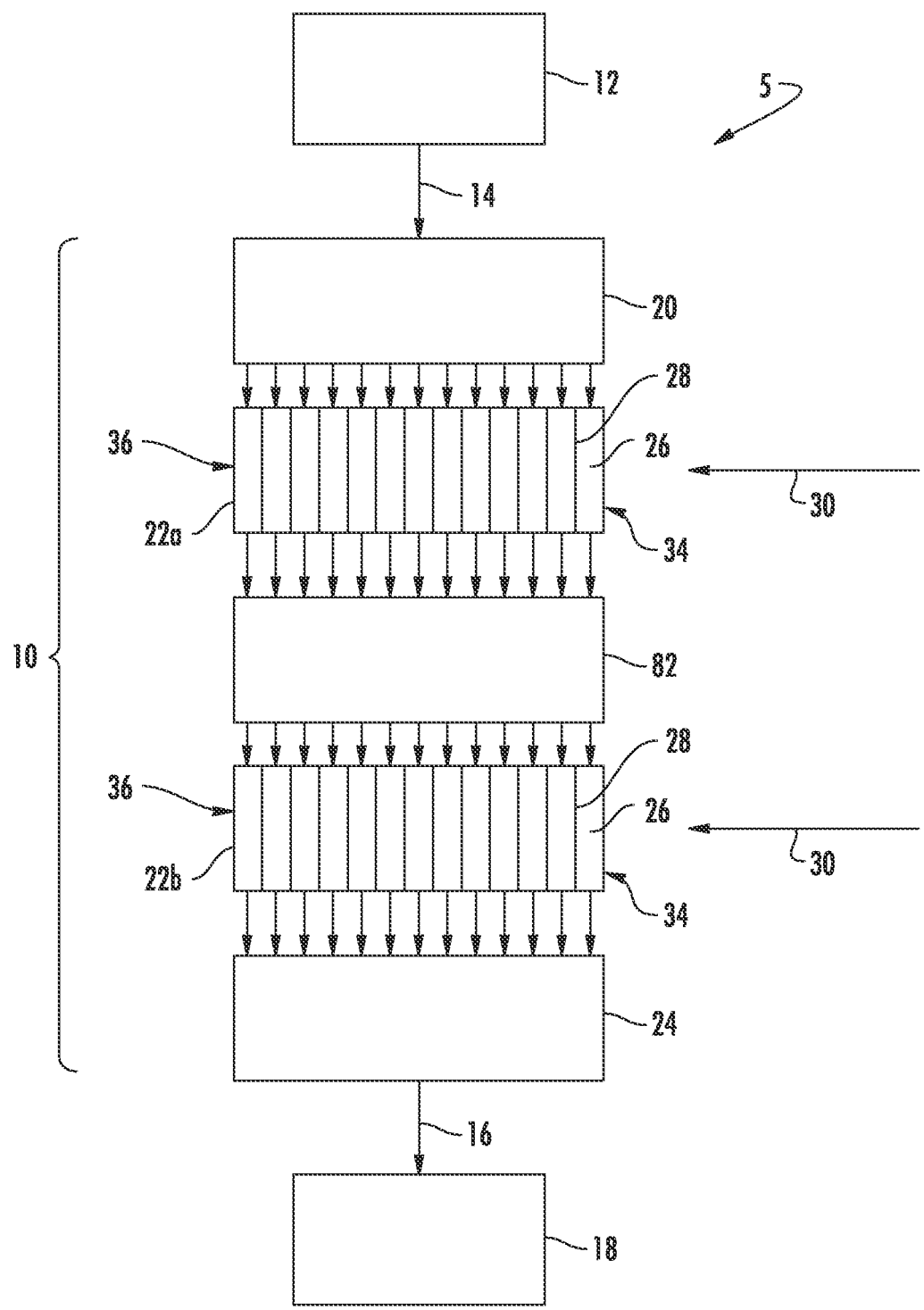
FIG. 7 shows a schematic representation of an exemplary heat exchanger system where the heat exchanger is formed from a plurality of high pressure gas paths fluidly connected in series with respect to the high pressure flow path and separated by a mixing cavity, according to one embodiment.

FIG. 7 shows yet another embodiment of an exemplary heat exchange system 5 where the heat exchanger 10 includes a plurality of heat exchanger portions 22 between the input cavity 20 and the output cavity 24. The heat exchanger portions 22 are separated by a mixing cavity 82 such that the high pressure gas paths 26 of the first heat exchanger portion 22A are fluidly connected in series to the mixing cavity 82 for mixing therein after passing through the first heat exchanger portion 22A. The presence of the mixing cavity 82 restarts the thermal boundary layer in high pressure gas path 26. Then, the mixed gas passes into the high pressure gas paths 26 of the second heat exchanger portion 22B for further cooling therein.

Although shown as single pass systems with respect to the cooling fluid 30, multipass variants are also generally provided. That is, the high pressure path 26 makes multiple transits (i.e., passes) through the cooling fluid 30 before exiting the heat exchanger system 5. Such multi-pass arrangements can include co-flow and counter flow in the same system.

Figure 8:
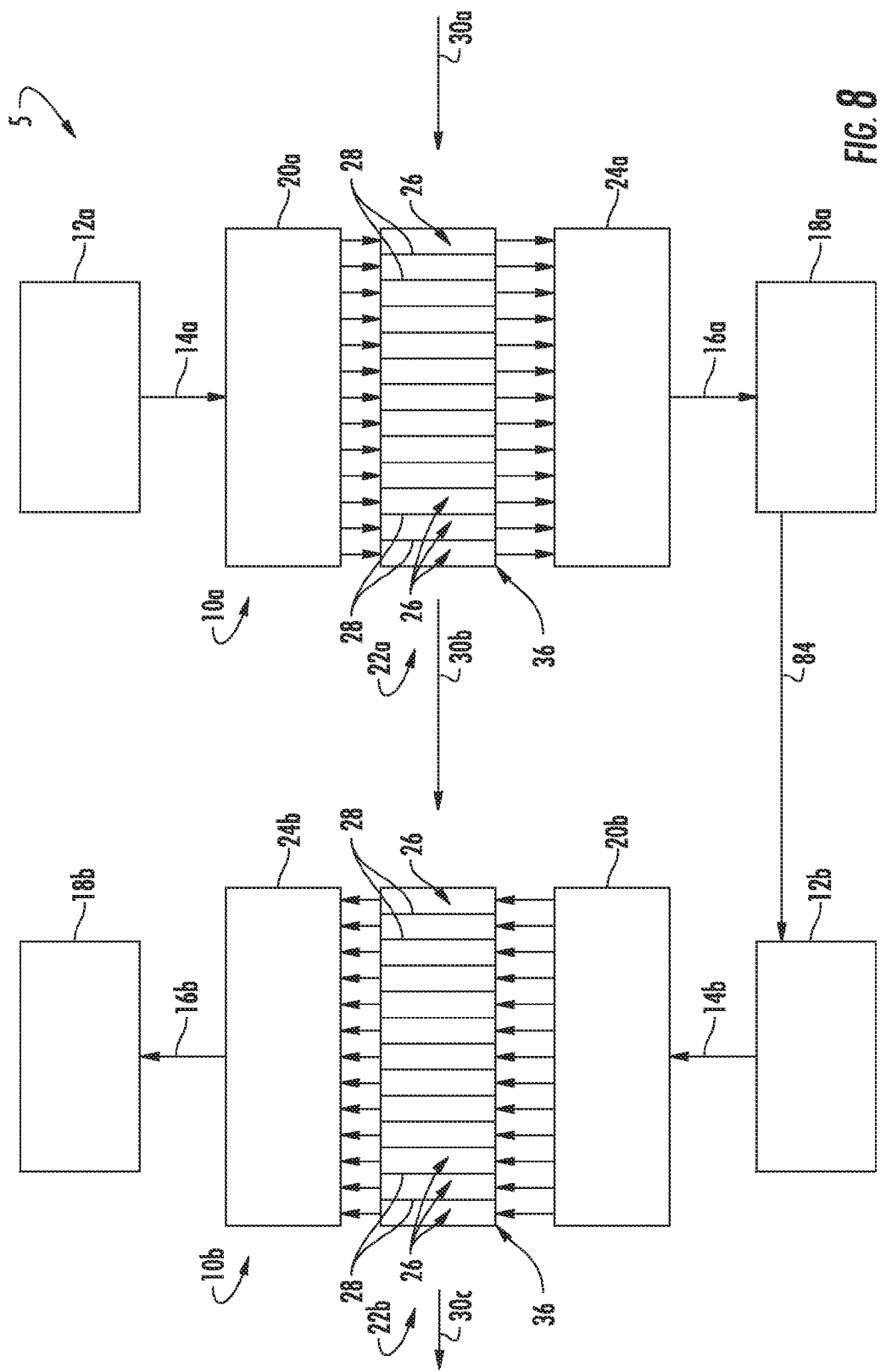
FIG. 8 shows a schematic representation of an exemplary heat exchanger system of a multipass variety where the high pressure gas paths are fluidly connected in series and where the cooling fluid flow paths are fluidly connected in series.

For example, FIG. 8 shows an exemplary heat exchanger system 5 that is a multipass variant with respect to the cooling fluid 30. In this embodiment, the hot air input 12 flows through the first heat exchanger 10a and into the second heat exchanger 10b. Thus, as shown, the heat exchangers 10a, 10b are serially connected to each other with respect to the flow path of the hot air. Additionally, the cooling fluid 30a flows through the first heat exchanger portion 22A to be a slightly warmer cooling fluid 30b to flow through the second heat exchanger portion 22B and exit as a slightly warmer cooling fluid 30c. Thus, as shown, the heat exchangers are also serially connected with respect to the flow path of the cooling fluid.

In the shown embodiment, the hot air flow path (including the high pressure paths 26a, 26b) has two passes through the cooling fluid flow path (including the cooling flow paths 32A, 32B) with one being in each heat exchanger 10a, 10b respectively. Although shown as having two passes by the high pressure path 26 through the cooling fluid 30, any number of passes can be utilized in the heat exchanger system 5.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A heat exchanger comprising:
an input cavity defined by inlet cavity walls;
a heat exchanger portion in fluid communication with the input cavity and defined between a first side and a second side, wherein a plurality of baffles are positioned within the heat exchanger portion; and
an outlet cavity in fluid communication with the heat exchanger portion and defined by outlet cavity walls,
wherein the heat exchanger portion comprises:
a plurality of first fluid paths defined between the baffles and extending from the input cavity to the outlet cavity, and
a plurality of tubes extending through the heat exchanger portion from the first side to the second side, wherein each tube extends through the baffles so as to define a second fluid path through the heat exchanger portion,
wherein each tube defines an inlet flow cross-section area at the first side and an outlet flow cross-section area at the second side, wherein at least one tube varies in its cross-section areas continuously from the first side to the second side of the heat exchanger portion.

2. The heat exchanger as in claim 1, wherein the first fluid paths are oriented in a cross-flow arrangement with respect to the second flow paths.

3. The heat exchanger as in claim 1, wherein at least one flow turbulating element is positioned on an external surface of a tube.

4. The heat exchanger as in claim 1, wherein at least one flow turbulating element is positioned on an internal surface of a tube.

5. The heat exchanger as in claim 1, wherein the tubes have a substantially oval shape through their length from the first side to the second side of the heat exchanger portion.

6. The heat exchanger as in claim 1, wherein each tube defines an inlet flow cross-section area at the first side and an outlet flow cross-section area at the second side, wherein the inlet flow cross-section area is larger than the outlet flow cross-section area.

7. The heat exchanger as in claim 1, wherein the heat exchanger portion comprises at least one side wall including a plurality of structural elements.

8. The heat exchanger as in claim 1, comprising a plurality of heat exchanger portions between the input cavity and the output cavity, wherein the plurality of heat exchanger portions are serially connected to each other with respect to the first flow path.

9. The heat exchanger as in claim 8, wherein a mixing cavity is positioned between each heat exchanger portion.

10. The heat exchanger as in claim 1, wherein the input cavity, the heat exchanger portion, and the outlet cavity define an integrated component formed via additive manufacturing.

11. The heat exchanger as in claim 1, wherein the baffles define the flow cross-section areas of the first fluid paths within the heat exchanger portion, wherein the flow cross-section areas vary in the first fluid paths from the inlet cavity to the outlet cavity.

12. The heat exchanger as in claim 11, wherein the flow cross-section areas of the first fluid paths vary between the first and second sides of the heat exchanger portion by changing baffle thickness, baffle spacing, tube spacing, or combinations thereof.

13. A heat exchanger comprising:
an input cavity defined by inlet cavity walls;
a heat exchanger portion in fluid communication with the input cavity and defined between a first side and a second side, wherein a plurality of baffles are positioned within the heat exchanger portion; and
an outlet cavity in fluid communication with the heat exchanger portion and defined by outlet cavity walls;
wherein the heat exchanger portion comprises:
a plurality of first fluid paths defined between the baffles and extending from the input cavity to the outlet cavity; and
a plurality of tubes extending through the heat exchanger portion from the first side to the second side, wherein each tube extends through the baffles so as to define a second fluid path through the heat exchanger portion;
wherein at least one baffle is defined by a laminate wall comprising a layered, composite material.

14. A heat exchanger comprising:
an input cavity defined by inlet cavity walls;
a heat exchanger portion in fluid communication with the input cavity and defined between a first side and a second side, wherein a plurality of baffles are positioned within the heat exchanger portion; and
an outlet cavity in fluid communication with the heat exchanger portion and defined by outlet cavity walls,
wherein the heat exchanger portion comprises:
a plurality of first fluid paths defined between the baffles and extending from the input cavity to the outlet cavity, and
a plurality of tubes extending through the heat exchanger portion from the first side to the second side, wherein each tube extends through the baffles so as to define a second fluid path through the heat exchanger portion,
wherein each tube defines an inlet flow cross-section area at the first side and an outlet flow cross-section area at the second side, wherein the inlet flow cross-section area is smaller than the outlet flow cross-section area.

15. A heat exchanger comprising:
an input cavity defined by inlet cavity walls;
a heat exchanger portion in fluid communication with the input cavity and defined between a first side and a second side, wherein a plurality of baffles are positioned within the heat exchanger portion; and
an outlet cavity in fluid communication with the heat exchanger portion and defined by outlet cavity walls,
wherein the heat exchanger portion comprises:
a plurality of first fluid paths defined between the baffles and extending from the input cavity to the outlet cavity, and
a plurality of tubes extending through the heat exchanger portion from the first side to the second side, wherein each tube extends through the baffles so as to define a second fluid path through the heat exchanger portion,
the heat exchanger further comprising;
a cooling input cavity positioned on the first side of the heat exchanger portion; and
a cooling output cavity positioned on the second side of the heat exchanger portion, wherein the plurality of tubes extend through the heat exchanger portion from the cooling input cavity positioned on the first side to the cooling output cavity positioned on the second side.

16. A heat exchanger system comprising:
at least two of the heat exchangers as in claim 1, wherein the heat exchangers serially connected to each other with respect to the first flow path, and wherein the heat exchangers are serially connected to each other with respect to the second flow path.

* * * * *